(12) United States Patent
Sallavanti et al.

(10) Patent No.: US 6,451,236 B1
(45) Date of Patent: Sep. 17, 2002

(54) METHOD OF MAKING PHOTOCHROMIC THERMOPLASTICS

(75) Inventors: Robert A. Sallavanti, Dalton; Michael J. Lubianetsky, Blakely, both of PA (US)

(73) Assignee: Gentex Optics, Inc., Carbondale, PA (US)

( * ) Notice: Subject to any disclaimer, the term of this patent is extended or adjusted under 35 U.S.C. 154(b) by 0 days.

(21) Appl. No.: 09/497,073

(22) Filed: Feb. 2, 2000

(51) Int. Cl.[7] ............................................... B29C 71/00
(52) U.S. Cl. ...................... 264/129; 264/143; 264/157; 264/211.13; 264/340
(58) Field of Search ................................. 264/129, 142, 264/143, 157, 211.12, 211.13, 340, 349; 428/409; 427/314, 372.2

(56) References Cited

U.S. PATENT DOCUMENTS

| | | |
|---|---|---|
| 3,821,148 A | 6/1974 | Makowski et al. |
| 3,821,149 A | 6/1974 | Makowski et al. |
| 4,043,637 A | 8/1977 | Hovey |
| 4,323,597 A | 4/1982 | Olson |
| 4,657,345 A | 4/1987 | Gordon |
| 4,830,873 A | 5/1989 | Benz et al. |
| 4,880,667 A | 11/1989 | Welch |
| 4,913,544 A | 4/1990 | Rickwood et al. |
| 4,923,909 A | 5/1990 | Kuo et al. |
| 4,937,026 A * | 6/1990 | Goossens et al. |
| 4,980,221 A | 12/1990 | Kobayashi et al. |
| 5,238,981 A | 8/1993 | Knowles |
| 5,257,491 A | 11/1993 | Rouyer et al. |
| 5,268,231 A | 12/1993 | Knapp-Hayes |
| 5,272,010 A | 12/1993 | Quinn |
| 5,274,132 A | 12/1993 | VanGemert |
| 5,277,986 A | 1/1994 | Cronin et al. |
| 5,453,100 A | 9/1995 | Sieloff |
| 5,716,900 A | 2/1998 | Kronzer et al. |
| 5,824,464 A | 10/1998 | Schell et al. |
| 5,959,761 A * | 9/1999 | Perrott et al. |
| 5,968,207 A | 10/1999 | Li |
| 5,975,696 A * | 11/1999 | Kohan |
| 5,981,634 A * | 11/1999 | Smith et al. |
| 6,114,437 A * | 9/2000 | Brown et al. |
| 6,162,574 A | 12/2000 | Kobayashi et al. |

FOREIGN PATENT DOCUMENTS

| | | |
|---|---|---|
| DE | 41 27 810 A1 | 2/1993 |
| DE | 43 04 488 | 6/1994 |
| EP | 0 141 407 | 5/1985 |
| EP | 0 322 556 | 7/1989 |

* cited by examiner

*Primary Examiner*—Mark Eashoo
(74) *Attorney, Agent, or Firm*—Keusey, Tutunjian & Bitetto, P.C.

(57) ABSTRACT

A method of making photochromic thermoplastic wherein the material is extruded into a length or lengths having at least one relatively small cross-sectional dimension. The length or lengths are treated with a solution of photochromic dye dissolved in a solvent, for example, cyclohexanone, which attacks the material. The length or lengths have a surface area-to-volume ratio sufficiently large to absorb an effective amount of the dye at their surface or surfaces. The length or lengths are dried to evaporate the solvent. The length or lengths are heated during the treating and drying steps. The dried length or lengths are cut into smaller pieces which may be introduced directly into a molding machine to form photochromic articles. Where a plurality of lengths are provided, the surfaces thereof are maintained separated from one another during the treating and drying steps.

32 Claims, 2 Drawing Sheets

METHOD OF MAKING PHOTOCHROMIC THERMOPLASTICS

BACKGROUND OF THE INVENTION

1. Field of the Invention

The invention relates to the field of dyeing of plastics. More particularly, it relates to dyeing polycarbonate with photochromic dyes.

2. The Prior Art

Attempts have been made to blend photochromic dyes into thermoplastics such as polycarbonate, which is a condensation polymer resulting typically from the reaction of bisphenol A derivatives with phosgene. However, the dyes do not survive the temperatures involved in heating the polycarbonate to form the molded article. Typically, the polycarbonate is provided in pellets suitable for gravity feed into the barrel of a molding machine.

To overcome this problem, the prior art discloses treating the polycarbonate pellets with a solution of photochromic dye in a cyclohexanone solvent and drying the treated pellets to evaporate the cyclohexanone in a first drying step. However, the pellets coalesce into clumps, entraining some cyclohexanone which cannot be driven off. We have found that any attempt to use these clumps for molding fails, since the molding material becomes a viscous mass which adheres to the mold and cannot form the desired article. The clumps must be ground to particles of a size equal to or less than that of the original pellets to expose the solvent-entraining surfaces. The ground particles are subject to a second drying step to evaporate the entrained solvent; and the dried particles are used to mold an article. While the solvent cyclohexanone enables photochromic dyes to survive during molding, the use of cyclopentanone or cycloheptanone solvents have minimal effect in providing a molded thermoplastic article with photochromic properties.

SUMMARY OF THE INVENTION

One object of our invention is to eliminate the grinding and second drying steps.

Another object of our invention is to extrude the pellets into a continuous length which is treated with a cyclohexanone dye solution and then dried in a single step.

A further object of our invention is to extrude the pellets into a plurality of discrete lengths and, while keeping their surfaces separated, treat and dry the plurality of lengths.

A still further object of our invention is to prevent the entrainment of any cyclohexanone within the thermoplastic material.

These objects are accomplished by providing a relatively large length of thermoplastic material and more particularly polycarbonate. The length is. formed either as a sheet with a small thickness and an appreciably larger width or as a rod where both cross-sectional dimensions are relatively small. The length is treated with a heated solution of photochromic dye in a cyclohexanone solvent which attacks the surface of the polycarbonate. The length is dried to evaporate the solvent and then cut into small pieces suitable for storage or introduction directly into a molding machine.

Alternatively, a plurality of lengths with at least one relatively small cross-sectional dimension, as described above, are provided. While maintaining the surfaces of the lengths separated from each other, they are treated with the heated solution and dried. The dried lengths are cut into small pieces suitable for storage or introduction directly into a molding machine.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENTS

Figure 1:
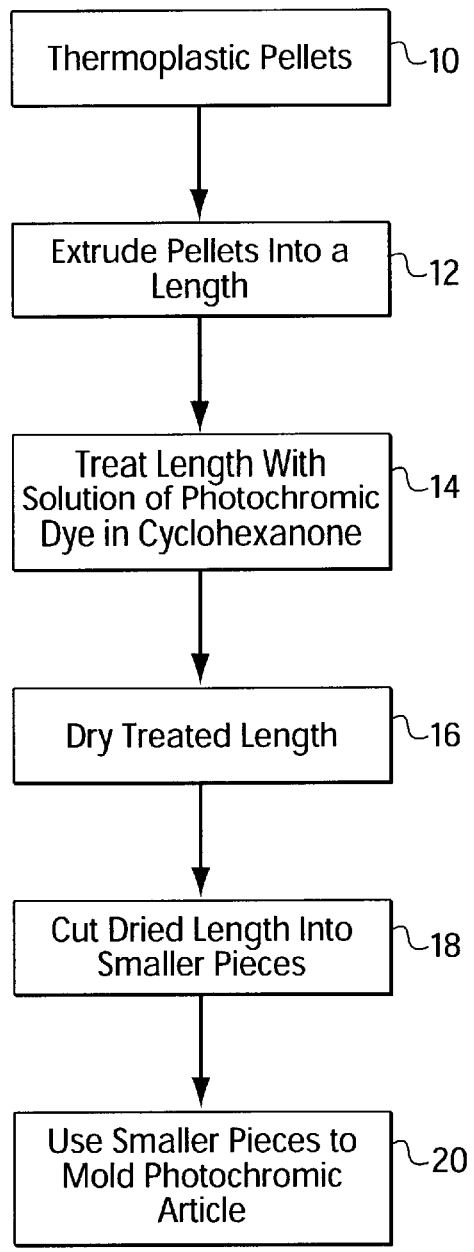
FIG. 1 is a flow diagram showing the steps for processing a single continuous length of thermoplastic.

Referring now to FIG. 1, thermoplastic pellets 10 of, for example polycarbonate, are fed to an extruder where they are heated to a melting temperature of between 450° F. and 500° F. for example, and continuously extruded into an indefinite length in step 12. The cross-sectional area of the extended length should have at least one relatively small dimension. The extruded length may be in the form of a sheet having one small cross-sectional dimension or in the form of a rod having a circular, square or other cross-sectional shape wherein both cross-sectional dimensions are small. An essential feature is that the surface area-to-volume ratio of the extruded length is sufficiently high to permit absorption of an effective amount of dye solution. For known dye concentrations based on the pellet size, the extruded length can be easily dimensioned to provide the same surface area-to-volume ratio as pellets 10 which will be discussed in greater detail below.

The length is then treated at an elevated temperature with a solution of photochromic dye dissolved in cyclohexanone, in step 14. The length is dried in step 16 to evaporate the solvent. The dried length is then cut into smaller pieces in step 18. The smaller pieces are roughly equivalent in volume or size to the pellets 10 which are typically used as the starting material in conventional molding machines. The small pieces may be stored for subsequent use or fed directly into a molding machine to mold photochromnic articles 20.

Figure 2:
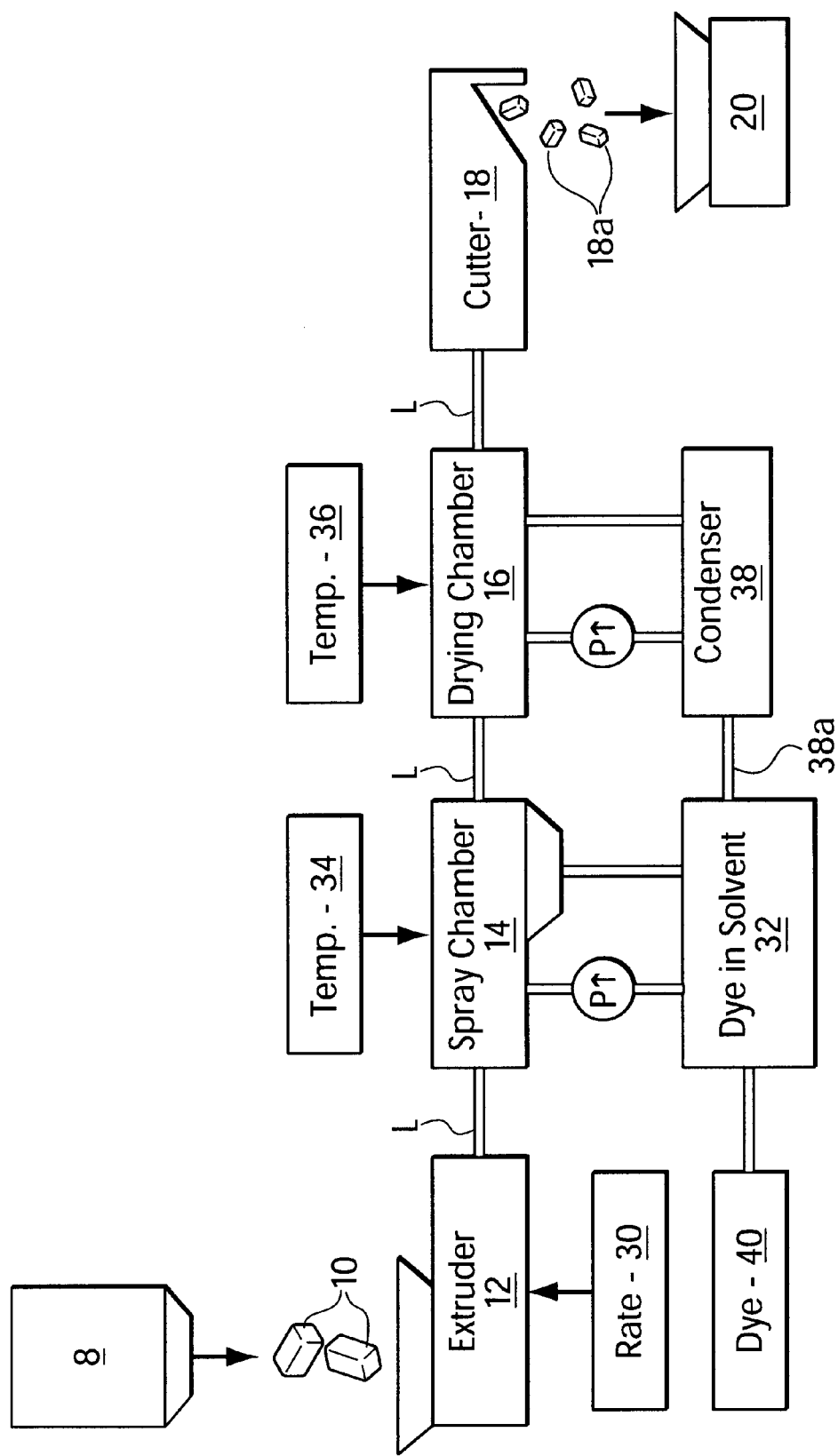
FIG. 2 is a schematic view showing apparatus for practicing the method of FIG. 1.

Referring now to FIG. 2, supply bin 8 dispenses pellets 10 into extruder 12 where they are extruded into a single length L of thermoplastic in the form of a rod or sheet which is fed sequentially to spray chamber 14, drying chamber 16 and cutter 18. The speed at which the length passes through the subsequent stations is determined by a rate control 30. Rate control 30 governs the speed of extruder 12 which pushes the length L through the various stations. It will be understood that supply bin 8 includes means for controlling the rate at which pellets 10 are supplied to the extruder 12 to maintain its hopper inlet at a constant level. Cutter 18 slices the length L into small pieces 18a which collect in a container or hopper 20 which may be the inlet of a molding machine.

A reservoir 32 contains a solution of photochromic dye in cyclohexanone solvent. The solution is pumped into spray chamber 14 through nozzles to impinge upon the length as it passes therethrough. A temperature control 34 governs heaters within chamber 14 to maintain the solution at a temperature in the range of about 250° F. to about 290° F. The temperature should be relatively high to increase the rate at which the solvent attacks the thermoplastic in chamber 14 but a safe margin below the boiling point of cyclohexanone of 311° F.

Drying chamber 16 also includes a temperature control 36 governing heaters which maintain the treated length at a temperature in the range of 330° F. to 400° F. The temperature should be well above the 311° F. boiling point of cyclohexanone but a safe margin below the melting point of polycarbonate which is in the range of 450° F. to 500° F. Blowers,may be provided within drying chamber 16 to direct high velocity heated air onto the one or more surfaces of the treated lengths and increase the speed of drying. The evaporated solvent is collected, for example by cooling and condensing the vapor in a condenser 38. The condensed solvent is returned through conduit 38a to reservoir 32. Make-up dye is provided to reservoir 32 from a photochromic dye source 40.

Cyclohexanone is a liquid which attacks the surface of the polycarbonate allowing penetration of the photochromic dye. The cyclohexanone attacks the surface of the length L during a time extending from application until fully evaporated. The time interval between treating the length L and drying of the solvent is determined by how quickly the length moves through spray chamber 14 and drying chamber 16; such time interval being adjustable by rate controller 30. The surface area-to-volume ratio of the length in conjunction with rate controller 30 determines the dye density within the dried pieces 18a.

Figure 3:
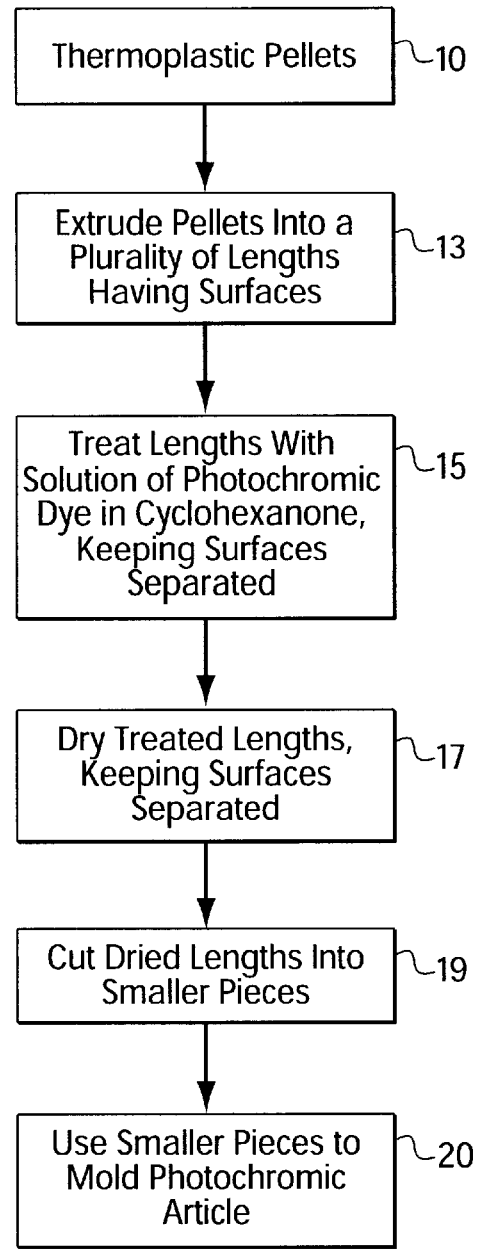
FIG. 3 is a flow diagram showing the steps for processing a plurality of discrete lengths of thermoplastic.

Referring now to FIG. 3, thermoplastic pellets 10 are heated to a melting temperature of 450° F. to 500° F. and extruded into an indefinite length which is cut into a plurality of discrete lengths having surfaces in step 13. The extruded length has at least one small cross-sectional dimension as with the length described above with reference to FIG. 1. The lengths are. spaced from one another, so that their surfaces are not in contact, for sequential transport through spray chamber 15 and drying chamber 17 to cutter 19. The lengths are treated with a solution of photochromic dye in cyclohexanone solvent in step 15. The treated lengths are dried in step 17 and cut into smaller pieces. in step 19. The smaller pieces are stored for subsequent use or fed directly into a molding machine to mold photochromic articles in step 20.

The cylindrical polycarbonate pellets 10, used as the starting material, may be ⅛" in diameter and ⅛" in length, like those sold under the trade name Miles FCR 2405-1112. The length L may be a square rod having 0.1" by 0.1" cross-sectional dimensions. It should be noted that such a square rod has a surface area-to-volume ratio of 40:1 which is slightly lower than the pellets used as the starting material. However, reducing cross-sectional dimensions to 0.0833" by 0.0833" provides a surface area-to-volume ratio of 48:1, the same as pellets 10. Alternatively, the continuously extruded rod or strand may be provided with a circular cross-section having, for example, a diameter of 0.0833" to obtain a surface-to-volume ratio of 48:1. The extruded length may be a plate having a thickness of 0.0417" to produce a surface-to-volume ratio of 48:1.

The photochromic dyes may be Variacrol Blue A, Variacrol Blue D, Variacrol Red PNO, and Variacrol Photo L also known as Variacrol (Yellow) L and are available from Enichem America, Inc. of New York, N.Y. These dyes, or equivalent, may be used individually or in any combination for various tint colors. For example, 0.095 grams of each of the four dyes may be used per pound of polycarbonate. The solution may be 8.33 grams of dye per liter of cyclohexanone; and each liter of solution may treat 10 kilograms of polycarbonate. A squeegee may be positioned at the outlet of the spray chamber to remove excess solution except perhaps for a thin film on the surface of the rod.

The rod then passes into the drying chamber maintained at a temperature of 350° F. Heated air is directed onto the rod surfaces to facilitate evaporation of the solution. A blower may circulate vapor from the drying chamber along a path past a condenser, for example. The solvent is condensed from the vapor and returned to reservoir 32. The air, free of the vaporized solvent, is then reheated to 350° F. and directed back to the rod surface. Based on the extrusion rate, the drying chamber should be sufficiently long to evaporate substantially all of the cyclohexanone solvent from the surface of the rod.

The cyclohexanone-dye solution attacks the surface of the rod upon application and continues during an appreciable portion of its transit through the drying chamber until is completely evaporated. This attack time is controlled primarily by the extrusion rate and determines the weight of dye per unit area of the length. The advantage of our process is that the continuous rod presents a uniform surface for evaporation of the solvent. In contrast thereto, the prior art pellets, or granules, clump together and entrap or entrain the solvent which cannot be evaporated unless the clumps are separated into their constituent pellets, particles or granules and subjected to a secondary drying step.

The rod exits the drying chamber at 350° F. At 0.1" intervals for example along its length, the rod is readily cut into cubes which are collected as the starting material for subsequent molding of photochromic articles.

Sample lenses 50 mm in diameter and 2 mm thick were molded between two polished stainless steel plates. The lenses had an initial transmission, in the unexcited state, of 70%. In the excited state, when illuminated for five minutes at eight inches distant from a BLE Spectraline Model B100 black light source which emits light over a broad UV and blue light wavelength range with a peak emission at about 365 nm, the sample lenses demonstrated a transmission of 35%. Relaxation to the unexcited state occurred under ambient room lighting conditions.

By evaporating substantially all of the cyclohexanone, the resulting thermoplastic is provided with photochromic dye which survives the molding process. In manufacturing lenses or other optical devices according to the invention, excellent photochromic characteristics were observed without affecting the physical, optical, or mechanical properties of the polycarbonate.

In the process of FIG. 3, the plurality of lengths may be of equal length ranging from 1" to 36" or more. Preferably, the length is ten times greater, or more, than the relatively small cross-sectional dimensions. At these lengths, the end surfaces become negligible when calculating surface area-to-volume ratios. The cut lengths may be placed laterally on a transport belt which is stepped in increments. The belt may be equipped with lugs to ensure separation between adjacent rods or plates. Adjacent rods or plates are separated from one another as they pass through the treating and drying stations so that the solvent is not entrained between contacting surfaces. The rods are subsequently cut into cubes or cylinders. Molded polycarbonate optical devices formed from the smaller pieces 19 possess excellent photochromic characteristics.

It will be seen that we have accomplished the objects of our invention. We have provided a process for incorporating photochromic dyes into polycarbonate without affecting the physical and mechanical characteristics of the polycarbonate which make it an ideal molding material for optical devices. We have achieved this by continuously extruding the polycarbonate into an indefinite length having at least one relatively small cross-section. The length is treated and dried, wherein its singular, uniform outer surface allows complete evaporation of the solvent without entrainment. The length is cut into photochromic thermoplastic pellets, which could only be made previously by employing a grinding step followed by a second drying step.

We have also provided a process whereby a plurality of lengths are extruded and maintained separated during the treating and drying steps. The separation of the lengths provides a plurality of uniform outer surfaces, once again allowing complete evaporation of the solvent without entrainment. Our process permits effective control of the dye density by selectively adjusting the cross-section of the length or lengths in conjunction with the extrusion rate. Our process may be configured to continuously supply photochromic thermoplastic to the inlet hopper of a molding machine.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

What is claimed is:

1. A method of making a photochromic thermoplastic material comprising the steps of:
    extruding a length of thermoplastic material comprising a first part, a second part and two cross-sectional dimensions, at least one of which is small in relation to the length;
    treating the first part of said length with a solution comprising a photochromic dye dissolved in a solvent which affects said thermoplastic material;
    during said treating step, drying the second part of said treated length to evaporate the solvent; and
    cutting the dried length into smaller pieces having photochromic properties.

2. A method as in claim 1, wherein the length of the thermoplastic material comprises a sheet having a thickness which is small in relation to a width of the sheet.

3. A method as in claim 1, wherein both cross-sectional dimensions of the length are small in relation to the length.

4. A method as in claim 1 wherein the thermoplastic material is polycarbonate and the solvent is cyclohexanone.

5. A method as in claim 1, wherein said length comprises a surface-area-to-volume ratio sufficiently large to permit absorption of an effective amount of dye at the surface thereof.

6. A method as in claim 1, wherein the pieces are sufficiently small to be introduced directly into a molding machine.

7. A method as in claim 1, further including heating the first part of the length during said treating step.

8. A method as in claim 7, wherein the solvent has a boiling temperature and the first part of the length is heated to a temperature less than the boiling temperature during said treating step.

9. A method as in claim 1, additionally including heating the second part of the treated length during said drying step to increase the rate of evaporation of solvent from a surface of the second part of the treated length.

10. A method as in claim 9, wherein the solvent has a boiling temperature and the thermoplastic has a melting temperature and wherein the second part of the treated length is heated during the drying step to a temperature greater than said boiling temperature but less than said melting temperature.

11. A method as in claim 1, wherein the length providing step comprises the steps of:
    providing pellets of the thermoplastic material; and
    extruding said pellets into said length.

12. A method as in claim 11, wherein the thermoplastic material has a melting temperature and wherein the method further includes the step of heating the pellets to the melting temperature during the extruding step.

13. A method of making a photochromic thermoplastic material comprising the steps of:
    extruding a plurality of lengths of thermoplastic material comprising a surface and two cross-sectional dimensions, at least one of which is small in relation to each of the lengths;
    treating said lengths with a solution comprising a photochromic dye dissolved in a solvent which affects said thermoplastic material; and
    drying the solvent off of said lengths, wherein the surfaces of said lengths are maintained separated during the drying step.

14. A method as in claim 13, wherein the surfaces of said lengths are maintained separated during the treating step.

15. A method as in claim 13, wherein each length comprises a sheet having a thickness which is small in relation to a width of the sheet.

16. A method as in claim 13, wherein both cross-sectional dimensions of the lengths are small in relation to the lengths.

17. A method as in claim 13 including the further step of cutting the dried lengths into smaller pieces having photochromic properties.

18. A method as in claim 17, wherein the pieces are sufficiently small to be introduced directly into a molding machine.

19. A method as in claim 13, wherein each of said lengths comprises a surface-area-to-volume ratio large enough to permit absorption of an effective amount of dye at the surface thereof.

20. A method as in claim 13, wherein the thermoplastic material is polycarbonate and the solvent is cyclohexanone.

21. A method as in claim 13, further including heating the lengths during said treating step.

22. A method as in claim 21, wherein the solvent has a boiling temperature and each length is heated to a temperature less than the boiling temperature during said treating step.

23. A method as in claim 13, additionally including heating the lengths during said drying step to increase the rate of evaporation of solvent from the surfaces.

24. A method as in claim 13, wherein the solvent has a boiling temperature and the thermoplastic has a melting temperature and wherein each length is heated during the drying step to a temperature greater than said boiling temperature but less than said melting temperature.

25. A method as in claim 13, wherein the step of providing the lengths further comprises the steps of:
    providing pellets of the material; and
    extruding said pellets into said lengths.

26. A method as in claim 25, wherein the thermoplastic material has a melting temperature and wherein the method further comprises the step of heating the pellets to the melting temperature during the extruding step.

27. A method of making a photochromic thermoplastic material comprising the steps of:
    extruding a length of thermoplastic material comprising two cross-sectional dimensions, at least one of which is small in relation to the length;

treating said length with a solution comprising a photochromic dye dissolved in a solvent which affects said thermoplastic material, wherein the solvent has a boiling temperature and the length is heated to a temperature less than the boiling temperature during said treating step;

drying said treated length to evaporate the solvent; and cutting the dried treated length into smaller pieces having photochromic properties.

28. A method of making a photochromic thermoplastic material comprising the steps of:

extruding a length of thermoplastic material comprising two cross-sectional dimensions, at least one of which is small in relation to the length;

treating said length with a solution comprising a photochromic dye dissolved in a solvent which affects said thermoplastic material, drying said treated length to evaporate the solvent, wherein the solvent has a boiling temperature and the thermoplastic has a melting temperature and wherein the length is heated during the drying step to a temperature greater than said boiling temperature but less than said melting temperature to increase the rate of evaporation of solvent from a surface of the length during said drying step; and cutting the dried treated length into smaller pieces having photochromic properties.

29. A method of making a photochromic thermoplastic material comprising the steps of:

extruding a plurality of lengths of thermoplastic material comprising a surface and two cross-sectional dimensions, at least one of which is small in relation to the lengths;

treating said lengths with a solution comprising a photochromic dye dissolved in a solvent which affects said thermoplastic material; and drying the solvent off of said lengths, wherein the surfaces of said lengths are maintained separated during the treating and drying steps.

30. A method of making a photochromic thermoplastic material comprising the steps of:

extruding a plurality of lengths of thermoplastic material comprising a surface and two cross-sectional dimensions, at least one of which is small in relation to the lengths;

treating said lengths with a solution comprising a photochromic dye dissolved in a solvent which affects said thermoplastic material, wherein the surfaces of said lengths are maintained separated during the treating step, wherein the solvent has a boiling temperature and each length is heated to a temperature less than the boiling temperature during the treating step; and drying the solvent off of said lengths.

31. A method of making a photochromic thermoplastic material comprising the steps of:

extruding a plurality of lengths of thermoplastic material having two cross-sectional dimensions, at least one of which is small in relation to the lengths, each length having a surface;

treating said lengths with a solution comprising a photochromic dye dissolved in a solvent which affects said thermoplastic material, wherein the surfaces of said lengths are maintained separated during the treating step; and drying the solvent off of said lengths, wherein the solvent has a boiling temperature and the thermoplastic has a melting temperature and wherein each length is heated during the drying step to a temperature greater than said boiling temperature but less than said melting temperature.

32. A method of making a photochromic thermoplastic material comprising the steps of:

extruding one or more lengths of thermoplastic material, each length comprising a surface and two cross-sectional dimensions, at least one of which is small in relation to the one or more lengths;

treating said one length with a solution comprising a photochromic dye dissolved in a solvent which affects said thermoplastic material; and drying the solvent off of said one length while maintaining the surface of said one length separated from any other lengths.

* * * * *